UNITED STATES PATENT OFFICE.

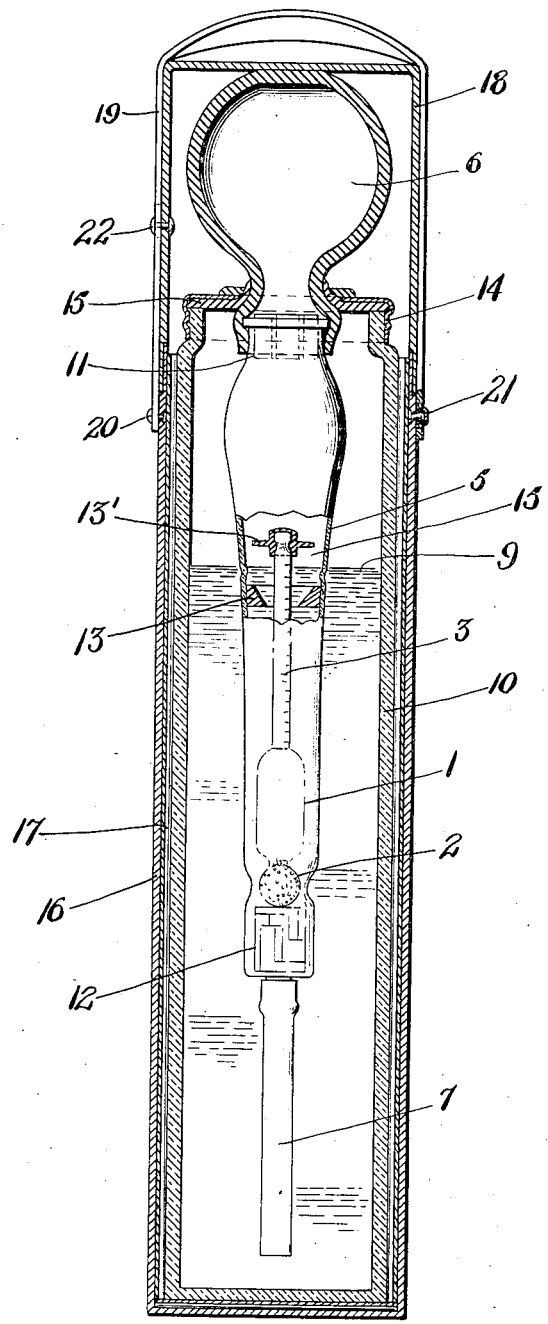

JACOB STEINER, OF LONG ISLAND CITY, NEW YORK.

HYDROMETER APPARATUS.

1,304,115.     Specification of Letters Patent.     Patented May 20, 1919.

Application filed January 17, 1919. Serial No. 271,581.

*To all whom it may concern:*

Be it known that I, JACOB STEINER, a citizen of the United States, residing at Long Island City, in the county of Queens and State of New York, have invented certain new and useful Improvements in Hydrometer Apparatus, of which the following is a specification.

This invention relates to hydrometers and particularly to those for use with automobiles, and which are adapted to be packed away in the tool kit. The object of the invention is to provide a hydrometer and a float chamber for the liquid in assembled condition ready for use and in connection with means for drawing the liquid into the float chamber.

In prior apparatus it has been necessary in order to avoid breakage to pack the hydrometer and other parts separately and assemble and disassemble and clean them for each use. These separated parts are liable to be misplaced and, the apparatus being usually of glass, repeated handlings in assembly and disassembly require great care and time and are attended with constant danger of breaking the instrument.

In the apparatus of this invention, the parts are all packed in the package in assembled position ready for use, so that it is only necessary to remove the assembled parts from the package and replace them after use. The hydrometer proper is so restricted and supported within its chamber that it cannot rattle around and be broken and the chamber in turn is rigidly and safely supported in a watertight cylinder which is permanently fitted within an outer container. Water kept in the cylinder serves to replenish the water in the battery and to maintain the hydrometer parts always clean and ready for use and also within the hydrometer float chamber the water has a cushioning effect aiding in protecting the hydrometer proper from jolts and jars.

In the accompanying drawing, the figure shown is a longitudinal section of one embodiment of this invention with parts broken away.

In the apparatus shown, 1 is a hydrometer weighted at 2 and having a scale 3 to indicate the specific gravity of liquid in the float chamber provided by the tapering glass tube 5. To draw the liquid into the float chamber the tube 5 has fastened to its upper end a rubber bulb 6 and to its lower end the rubber piping 7 adapted to reach into a liquid container as for instance, a storage battery of an automobile. In use the bulb 6 is compressed and the end of pipe 7 is immersed in the liquid to be tested; on expansion of the bulb 6 the resultant vacuum draws the liquid up into the float chamber to float the hydrometer 1. When the test is finished compression of the bulb empties the chamber.

The liquid tested clings to parts of the apparatus and usually contains accumulative and injurious chemicals, for instance sulfates and sulfuric acid in storage battery electrolyte, so that it is highly desirable to clean the apparatus after each use. It is also desirable to have the parts of the apparatus packed away in the tool kit in a compact and safe manner, yet in properly assembled condition and always ready for use.

In the apparatus of this invention, the hydrometer and float chamber 15 are packed in distilled water in a watertight cylinder 10, so that all parts of the device are kept clean of impurities and the water always in the float chamber is a protection against sudden movement and breaking of the hydrometer 1. The tube 5 is provided above and below with the rubber plugs 11 and 12 serving as buffers for the hydrometer and in case the hydrometer is of glass auxiliary rubber buffer rings 13 or 13' may also be provided, or the hydrometer itself may be made of unbreakable material such as hard rubber.

The hydrometer parts are supported securely as a unit in the cylinder 10 by the screw top 14 fastened onto the rubber disk 15 integral with the bulb 6, the disk 15 also forming a watertight cover for the cylinder 10 when the top 14 is screwed down. The water carried in this watertight cylinder serves to replenish the storage battery electrolyte when the latter has evaporated or become too concentrated. The cylinder 10 is fitted permanently in a container 16 preferably lined with suitable shock resisting material 17 such as corrugated paper and having a cover 18 held on by a strap 19. The strap 19 is fastened to the container by rivet 20 and snap 21 and is slidingly held in proper position on the cover by rivet 22 in a slot in the strap. To open the cover it is only necessary to release snap 20 and the cover may be lifted and tilted back out of the way.

In use the cover 18 is opened and the top 14 unscrewed so that this top, the tube 5, bulb 6 and hydrometer 1 may be removed as a unit, the bulb 6 having been previously compressed to expel any liquid in the float chamber which may then be filled with the liquid to be tested. After the test, and the testing liquid having been expelled, this same apparatus may be used to supply water to fill the storage batteries or dilute the liquid therein and may then be replaced in the container, one or two squeezings of the bulb 6 serving to clean out and harmlessly dilute any clinging drops of the liquid tested. The cover 18 is then replaced and fastened and the container packed away in the tool kit with all parts cleaned and ready for the next use whenever desired.

The cylinder 10 is preferably of glass so that the liquid will not be in contact with metal and the container 16 is formed to deaden the shocks it may receive. The apparatus of this invention is advantageous over prior devices in that it is simple and compact in construction and convenient and practical in use. While the principle of the invention has been described in connection with the apparatus shown it is intended to cover such modifications thereof as fall within the scope of the appended claims.

I claim:—

1. Hydrometer apparatus adapted to be carried in the tool kit of an automobile, comprising the combination with a float hydrometer, of a containing tube having a float chamber for permanently housing said hydrometer, a hand operated suction device at one end of said tube for drawing liquid into said float chamber through the other end of said tube, a water-tight receptacle for said containing tube, a removable water-tight cover for sealing said receptacle adapted to be tightly fastened thereto and connected to said containing tube between said suction device and said tube, so that said cover will operatively suspend said tube in a liquid in said receptacle and said suction device will be exposed for manipulation.

2. Hydrometer apparatus adapted to be carried in the tool kit of an automobile, comprising the combination with a hydrometer, of a containing tube having a float chamber for said hydrometer, means within said chamber for protecting said hydrometer against shock, a watertight glass receptacle and means for removably supporting said tube and hydrometer in a liquid in said receptacle, a bulb attached to said tube for drawing liquid into said float chamber, and a container having a body permanently inclosing said cylinder and a removable cover inclosing said bulb when not in use.

3. Hydrometer apparatus adapted to be carried in the tool kit of an automobile comprising the combination with a hydrometer, of a containing tube having a float chamber for said hydrometer, a watertight receptacle, means for removably supporting said tube and hydrometer in said receptacle comprising a cover, a bulb attached to said cover and said tube for drawing liquid into said float chamber, and a shock absorbing container having a body permanently inclosing said cylinder and a removable cover inclosing said bulb when not in use.

4. Hydrometer apparatus adapted to be carried in the tool kit of an automobile, comprising the combination with an unbreakable hydrometer float, of a containing tube having a float chamber for permanently housing said hydrometer, a hand operated suction device at one end of said tube for drawing liquid into said float chamber through the other end of said tube, a watertight receptacle for said containing tube, a removable water-tight cover for sealing said receptacle adapted to be tightly fastened thereto and connected to said containing tube, so that said cover will operatively suspend said tube in a liquid in said receptacle and said suction device will be exposed for manipulation.

JACOB STEINER.